US008009726B2

(12) United States Patent
Saey (10) Patent No.: US 8,009,726 B2
(45) Date of Patent: Aug. 30, 2011

(54) CARRIER GROUPING IN MULTI-CARRIER SYSTEMS

(75) Inventor: Dimitri Saey, Mechelen (BE)

(73) Assignee: Broadcom Corporation, Irvine, CA (US)

(*) Notice: Subject to any disclaimer, the term of this patent is extended or adjusted under 35 U.S.C. 154(b) by 901 days.

(21) Appl. No.: 10/791,527

(22) Filed: Mar. 3, 2004

(65) Prior Publication Data

US 2005/0111535 A1    May 26, 2005

Related U.S. Application Data

(60) Provisional application No. 60/494,804, filed on Aug. 14, 2003.

(51) Int. Cl.
 *G11B 5/58* (2006.01)
(52) U.S. Cl. ......... 375/222; 375/219; 375/220; 375/221
(58) Field of Classification Search .................. 375/219, 375/220, 221, 222
See application file for complete search history.

(56) References Cited

U.S. PATENT DOCUMENTS

| | | | | |
|---|---|---|---|---|
| 5,539,777 | A * | 7/1996 | Grube et al. ................. | 375/316 |
| 5,790,550 | A * | 8/1998 | Peeters et al. ............... | 370/480 |
| 6,134,273 | A * | 10/2000 | Wu et al. ..................... | 375/261 |
| 6,292,515 | B1 * | 9/2001 | Kao et al. .................... | 375/260 |
| 6,295,515 | B1 * | 9/2001 | Kurshan et al. ................ | 703/13 |
| 6,366,554 | B1 * | 4/2002 | Isaksson et al. ............ | 370/206 |
| 6,445,731 | B1 * | 9/2002 | Yamano et al. .............. | 375/222 |
| 6,549,512 | B2 * | 4/2003 | Wu et al. ..................... | 370/210 |
| 6,961,369 | B1 * | 11/2005 | Tzannes ...................... | 375/220 |
| 7,042,367 | B2 * | 5/2006 | Gardner et al. ............. | 340/853.3 |
| 7,068,592 | B1 * | 6/2006 | Duvaut et al. ................ | 370/203 |
| 7,269,209 | B2 * | 9/2007 | Peeters ....................... | 375/222 |
| 7,286,609 | B2 * | 10/2007 | Maltsev et al. .............. | 375/267 |
| 7,460,465 | B2 * | 12/2008 | Bolinth et al. ............... | 370/206 |
| 2001/0012783 | A1 * | 8/2001 | Peeters et al. ............... | 455/500 |
| 2002/0039398 | A1 * | 4/2002 | Klinski ...................... | 375/377 |
| 2002/0172146 | A1 * | 11/2002 | Wu et al. .................... | 370/208 |
| 2003/0054852 | A1 * | 3/2003 | Ginesi et al. ................ | 455/522 |
| 2004/0081191 | A1 * | 4/2004 | Kwon et al. ................ | 370/431 |
| 2005/0032514 | A1 * | 2/2005 | Sadri et al. ................. | 455/423 |

OTHER PUBLICATIONS

PCT/DE2001/001622, published on Nov. 7, 2002.*

* cited by examiner

*Primary Examiner* — Chieh M Fan
*Assistant Examiner* — Siu Lee
(74) *Attorney, Agent, or Firm* — Sterne, Kessler, Goldstein & Fox P.L.L.C.

(57) ABSTRACT

In the present invention, a plurality of carriers in a multi-carrier DMT communication system is grouped into one or multiple carrier groups according to at least one carriergroup parameter. A carriergroup parameter defines a parameter relating to each carrier group rather than to individual carriers, and is used for receiving and transmitting messages or data using the carrier group or groups. In one embodiment of the present invention, multiple carrier groups of fixed-size are determined and the worst case signal-to-noise ratio for each carrier group is used for the carriergroup parameter for that specified carrier group. In another embodiment of the present invention, multiple carrier groups of variable-size are determined based on a carriergroup parameter such as a carriergroup bitloading parameter. The carriergroup bitloading parameter and the worst case carriergroup SNR parameter for each carrier group are used to define each carrier group for transmitting and receiving messages or data.

9 Claims, 6 Drawing Sheets

CARRIER GROUPING IN MULTI-CARRIER SYSTEMS

CROSS-REFERENCE TO RELATED APPLICATIONS

This application claims the benefit of U.S. Provisional Application No. 60/494,804, filed Aug. 14, 2003.

FIELD OF THE INVENTION

The present invention relates generally to a communication system, and more specifically, to a system and method for grouping carriers in multi-carrier systems.

BACKGROUND OF THE INVENTION

Broadband communication networks are used in a variety of high speed application services such as internet access, video conferencing, video on demand, and interactive TV. Although fiber optic cable is the preferred transmission media for such high data rate services, the lack of fiber optic cables in existing networks and the prohibitive costs of installing such optical networks have led telephone companies around the world to include existing twisted-pair loops in their next generation broadband access networks. Because current telephone wiring connections were not designed to support high speed data communications, technologies were developed to increase the transmission capabilities of existing telephone wiring. One technology for providing such high data rate services on existing twisted-pair connections is Asymmetrical Digital Subscriber Line (ADSL). ADSL transfers data over the higher frequencies in the twisted-pair copper wires that currently connect most homes and businesses. ADSL accomplishes this by increasing the transmission capabilities of the current telephone wiring connections. Another technology for providing high data rate services is Very high rate Digital Subscriber Line (VDSL). VDSL transmits high speed data over short reaches of twisted-pair copper telephone lines, with a range of speeds depending upon actual line length. Thus, both ADSL and VDSL technology enable data to be exchanged over the twisted-pair copper wires at much higher speeds than conventional modems and analogue lines.

To increase bandwidth capacity on existing twisted pair connections, ADSL and VDSL systems have adopted discrete multi-tone (DMT) modulation. DMT is a multiple carrier technique that divides the available bandwidth of a communications channel into a number of sub-channels, also referred to as carriers or bins. By working with a large number of carriers rather than a single carrier, the available channel capacity is maximized thereby optimizing performance of the transmission. Once a connection between two modems has been established, the modems continue to monitor the changing signal-to-noise ratios on the line and swap bits from one carrier to another to maintain system performance.

Current DMT modulation modems have several disadvantages. Traditionally, in DMT related modems, up to 4096 carriers may be used to transport bits. Different parameters relating to each individual carrier are stored and used for modem operations. Examples of the various parameters needed for modem operation include the gain, the number of bits that can be loaded onto each carrier (i.e. bit loading), and the signal-to-noise ratio ("SNR") of each carrier. One disadvantage of current DMT modulation systems is the consumption of large amounts of memory space required to store all these parameters for each individual carrier. Consequently, as the number of carriers increases, so does the amount of memory space required to store the parameters relating to each individual carrier.

Another disadvantage with current DMT systems is the amount of processing time required during the initialization phase of the modems. DMT modulation requires that the far-end transmitting modem be informed of the transmission channel response, such as bit loading and gain information for each carrier. Thus, the initialization time of current DMT systems with multiple carriers is long due to the significant amounts of memory required for storing all the parameters for each individual carrier and to the size and number of message transmissions between modems during the initialization phase.

Further limitations and disadvantages of conventional and traditional approaches will become apparent to one of skill in the art, through comparison of such systems with the present invention as set forth in the remainder of the present application with reference to the drawings.

It is an object of the present invention to solve the aforementioned problems by providing a system and method for grouping carriers in multi-carrier systems.

SUMMARY OF THE INVENTION

According to the present invention, these objects are achieved by a system and method as defined in the claims. The dependent claims define advantageous and preferred embodiments of the present invention.

A system for grouping a plurality of carriers in a DMT communication system in accordance with the present invention comprises a carriergrouping means for determining multiple carrier groups for the plurality of carriers in a transmission channel and for determining at least one carriergroup parameter for each of the multiple carrier groups; and a carriergroup transmitting means for transmitting messages comprising the at least one carriergroup parameter to a far-end modem via the transmission channel, to enable the far-end modem to send and receive messages using the multiple carrier groups.

In accordance with the present invention, a carriergroup parameter defines a parameter relating to the carrier group rather than to each individual carrier in the carrier group, and is used for transmitting messages to the far-end modem during the initialization phase of the modems. In one embodiment of the present invention, the carriergroup parameter is the worst case signal-to-noise ratio ("SNR") for the specified carrier group. In another embodiment, the carriergroup parameter is a "carriergroup bitloading parameter" for the specified carrier group. In one embodiment of the present invention, the size of each multiple carrier groups has a fixed size. In another embodiment, the size of each carrier group is variable and is determined dynamically based on a chosen individual parameter or a carriergroup parameter.

In another embodiment, a system in accordance with the present invention comprises a carriergroup transmitting means coupled to a transmission channel; a carriergroup receiving means coupled to the transmission channel for receiving parameters relating to a plurality of carriers in the transmission channel; and a carriergrouping means, coupled to the carriergroup transmitting means and to the carriergroup receiving means, for determining at least one carriergroup parameter and at least one carrier group for the plurality of carriers in the transmission channel based on the parameters received by the carriergroup receiving means; wherein the carriergroup transmitter means transmits data to the transmission channel comprising the at least one carriergroup parameter and the at least one carrier group.

A method for grouping a plurality of carriers in a DMT communication system in accordance with the present invention determines one or more carrier groups for the plurality of carriers in the DMT multi-carrier channel and determines at least one carriergroup parameter for each carrier group. In accordance with the present invention, a carriergroup parameter defines a parameter relating to the carrier group rather than to each individual carrier in the carrier group, and is used for transmitting messages to the far-end modem during the initialization phase of the modems.

In a preferred embodiment of the present invention, multiple carrier groups are determined which may be of either fixed or variable size. In a further embodiment, the carriergroup parameter defining each carrier group is the worst case signal-to-noise ratio for each carrier group. In another embodiment of the invention, the carriergroup parameter is a carriergroup bitloading parameter for the carrier group.

The system and method of the present invention advantageously group a plurality of carriers in a multi-carrier transmission channel into one or more carrier groups and define at least one carriergroup parameter relating to each carreri group. Thus, the present invention provides significant cost and time savings during the initialization phase since it is no longer necessary to transmit messages comprising the individual parameters for each individual carrier. This compression via carrier grouping in accordance with the present invention reduces the amount of memory required for storing carrier parameters and reduces the processing time required during the initialization phase of the modems. One skilled in the art will realize that the present invention is not limited to the specific carrier groupings or carrier group parameters listed here but will acknowledge that several other possibilities to achieve a desired carrier grouping and to define an appropriate carriergroup parameter can be conceived.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

Figure 1:
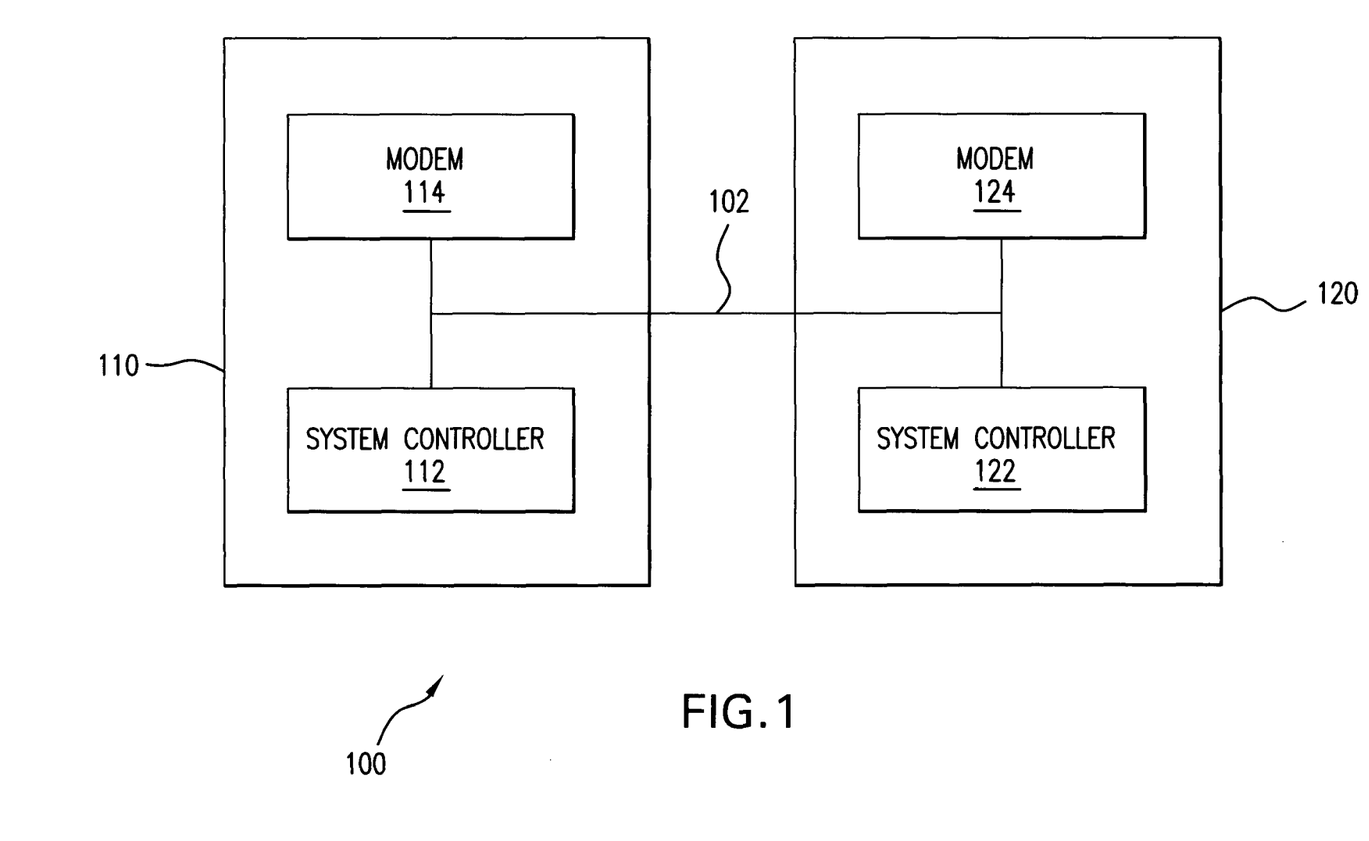
FIG. 1 illustrates a block diagram of a DMT communication system with two communication terminals in accordance with one embodiment of the present invention.

FIG. 1 illustrates a schematic block diagram of a DMT communication system 100 with a first terminal 110 and a second terminal 120, both terminals 110, 120 being coupled together by means of a transmission line 102. The first terminal 110 and the second terminal 120 each comprise a system controller 112 and 122, respectively. Additionally, the first terminal 110 and the second terminal 120 each comprise a modem 114 and 124. The communication system 100 is capable of implementing the present invention. In operation, a first terminal such as 110 transmits data across the transmission media 102 to a second terminal 120. The data is received at the second terminal 120 by the modem 124 which provides the received data to the system controller 122. In a similar fashion, data can be transmitted from the second terminal 120, across the transmission media 102, to the first terminal 110 where it is received by the first terminal modem 114, which then provides the data to the system controller 112.

Figure 2:
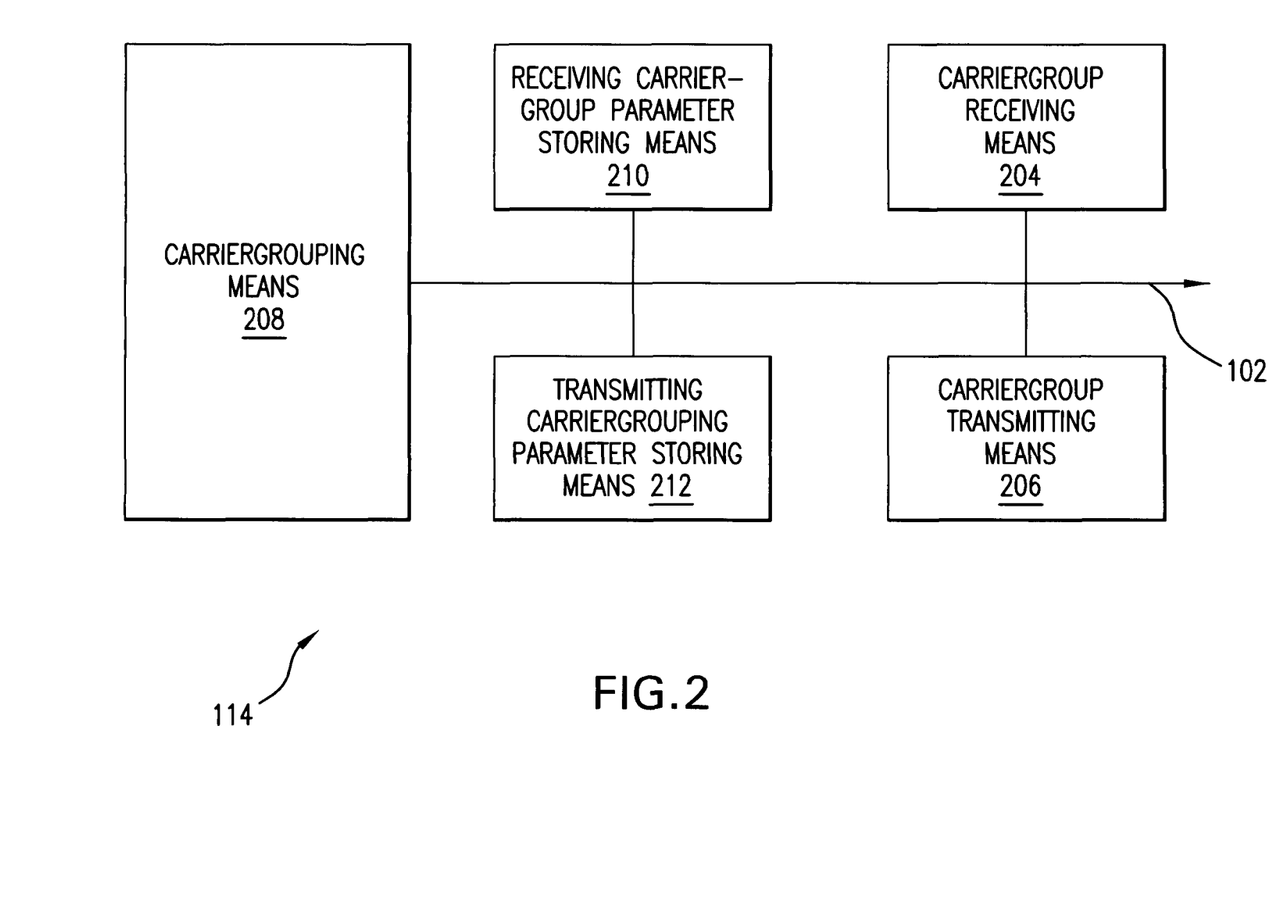
FIG. 2 illustrates a high level block diagram of a modem in accordance with one embodiment of the present invention.

FIG. 2 illustrates a high level block diagram of a modem 114 or 124 in accordance with one embodiment of the present invention. The modem 114 comprises a carriergrouping receiving means 204, a carriergrouping transmitting means 206, a receiving carriergroup parameter storing means 210, a transmitting carriergroup parameter storing means 212, and a carriergrouping means 208. The carriergrouping receiving means 204 is coupled to the transmission line 102 and is adapted for receiving messages or data transmitted over the transmission line 102. The carriergrouping transmitting means 206 is also coupled to the transmission line 102 for transmitting messages or data over the transmission line 102. The carriergrouping means 208 enables the modem 114 or 124 to group carriers in a multi-carrier system and to define parameters relating to carrier groups rather than individual carriers. Carriergroup parameters for carriers received from line 102 may be stored in the receiving carriergroup parameter means 210. Similarly, carriergroup parameters for carriers transmitted to line 102 may be stored in the transmitting carriergroup parameter storing means 212. One skilled in the art will realize that the present invention is not limited to the specific components or configuration illustrated here, but that the present invention may be implemented in a variety of ways in either hardware or software to achieve the results described below in more detail. For example, the receiving carriergroup parameter storing means 210 and the transmitting carriergroup parameter storing means 212 may be part of the carriergroup receiving means 204 and part of the carriergroup transmitting means 206, respectively.

In one embodiment of the present invention, during the initialization phase for communication between modems, the carriergrouping receiving means 204 receives or determines at least one individual parameter data for each individual carrier of the plurality of carriers from the multi-carrier transmission line or channel 102. For example, the carriergrouping receiving means 204 may receive a random signal transmitted on the channel and determine the signal-to-noise ratio data (hereinafter referred to as "SNR") for each individual carrier in the plurality of carriers from the random signal transmitted on the multi-carrier transmission channel 102. The individual parameter data for each individual carrier is then transmitted to the carriergrouping means 208. The carriergrouping means 208 analyzes the individual parameter data for each individual carrier and then determines at least one grouping for the plurality of carriers in the multi-carrier channel based on the individual parameter data received. In a preferred embodiment, the carriergrouping means 208 determines multiple groupings for the plurality of carriers in the transmission channel. The carriergrouping means 208 then defines or assigns at least one carriergroup parameter to the grouping or groupings. In a preferred embodiment, the carriergrouping means 208 determines multiple carriergroup parameters relating to each carrier group. A carriergroup parameter may define one or more parameters relating to the carrier group. Thus, the carriergroup parameter defines a parameter relating to the carrier group rather than to the individual carriers. A message containing the carriergroup parameters could then be sent to the far end system to enable the far end system to configure its system according to these carrier groups and carriergroup parameters and thus, enable the far end system to transmit messages or data using the carrier groupings and the carriergrouping parameters.

For example, in one embodiment of the present invention in which a near end carrier grouping system modem 114 is in communication with a far end carrier grouping system modem 124, the carriergrouping means 208 of the near end system may analyze the SNR data for each individual carrier in the multi-carrier channel 102. The carriergrouping means 208 may then determine the worst case SNR for the plurality of carriers, define the plurality of carriers as one carrier grouping, and use this worst case SNR to define a carriergroup parameter for the one carrier grouping. This carriergroup parameter could then be stored in the receiving carriergroup parameter storing means 210 of the near end system and be used for all messages received using the one carrier grouping. A message containing this carriergrouping parameter could then be sent to the far end carrier grouping system modem 124 and stored in the transmitting carriergrouping parameter storing means 212 so that the far end grouping system may configure its system according to this carriergroup parameter and transmit messages using the carriergrouping parameter. The carriergroup transmitting means 206 of the far end grouping system modem 124 would then be adapted for transmitting data via channel 102 using this carrier group and carriergroup parameter. Similarly, the carriergroup receiving means 204 of the near end carrier grouping system modem 114 is adapted for receiving transmissions using this carrier group and carriergrouping parameter.

In a preferred embodiment of the present invention, the carriergrouping means 208 of a near end carrier grouping system may determine multiple carrier groups. These carrier groups may have either a fixed size, such as 4 tones or 8 tones, or their size may be determined dynamically in order not to lose a specified amount of bit rate. The carriergrouping means 208 may then determine a "carriergroup SNR parameter" based on the worst case SNR of each carrier group and use this worst case SNR to define a carriergroup parameter for each carrier group. Additionally, the carriergrouping means 208 may also determine a "carriergroup bitloading parameter" and a "carriergroup gain parameter" for each carrier group based on the worst case SNR for the carrier group. These carriergroup parameters: the carriergroup SNR parameter, the carriergroup bitloading parameter, and the carriergroup gain parameter, could then define the carrier group and be stored in the receiving carriergrouping parameter storing means 210. A message containing these carriergroup parameters could then be sent to the far end carrier grouping system to enable the far end carrier grouping system to configure its system to transmit messages according to these carrier groups and carriergroup parameters. The carriergroup transmitting means 206 of the far end system is then adapted for transmitting data via channel 102 using these carriergroup parameters. Similarly, the carriergroup receiving means 204 of the near end system is adapted to receive transmissions from the far end system using these carriergroup parameters. Thus, after the near end system and far end system have been set up according to this carrier grouping information, subsequent messages transmitted using the multiple groups of carriers need only describe each carrier group using the carriergroup parameter or parameters. Because it is no longer necessary to transmit the individual parameters, such as bit loading and gain, for each individual carrier, the present invention provides significant cost and time savings by reducing the amount of memory required for storing carrier parameters and reducing the processing time required to receive and transmit messages.

Figure 3:
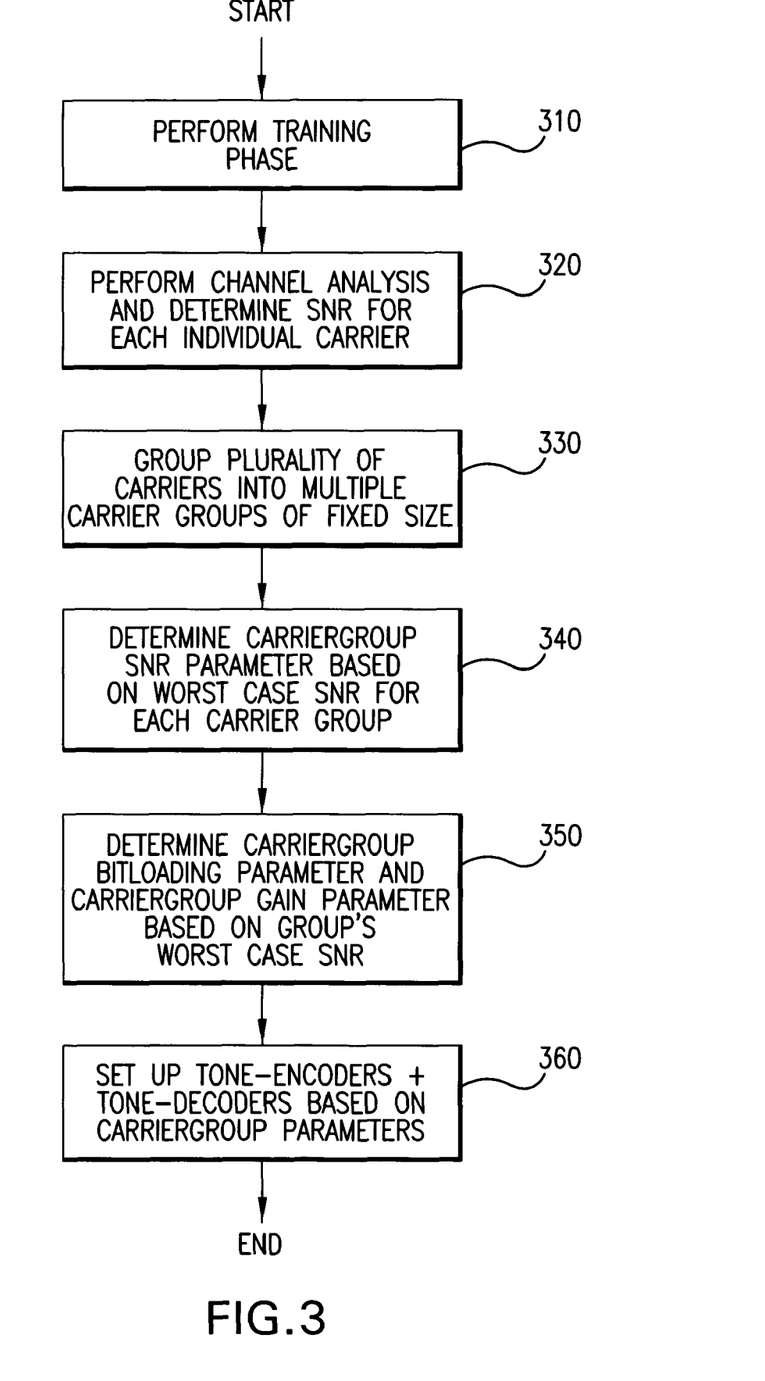
FIG. 3 is a flow chart illustrating one method for determining fixed-size carrier groups in accordance with one embodiment of the present invention.

FIG. 3 is a flow chart illustrating one method of grouping carriers in a multi-carrier system in accordance with one embodiment of the present invention. In this method, multiple carrier groups of fixed-size are determined for the plurality of carriers in the transmission channel. Either one or multiple carriergroup parameters are then determined and used to define each carrier group. While the specific embodiment in FIG. 3 addresses a specific DMT implementation, one skilled in the art will realize that the present invention may be applied to any DMT implementation.

At step 310, a training phase is performed. During the training phase 310, the DMT modem negotiates with the far end modem about parameters to be used, determining the channel transfer function, sample and symbol alignment, and channel equalization.

After the training phase 310 is completed, a channel analysis is performed 320. In one embodiment of the present invention, the channel analysis step 320 determines an SNR for each individual carrier in the channel. This may be done by determining the SNR on a random signal transmitted by the far end modem. The channel analysis step 320 may be performed as part of the initialization process.

At step 330, the plurality of carriers in the channel is grouped into multiple carrier groups of fixed size. For example, the plurality of carriers may be grouped into multiple groups of 4 tones or 8 tones.

At step 340, the worst case SNR for each fixed size carrier group is determined and used to define a "carriergroup SNR parameter" for that specific carrier group.

Once the worst case SNR for each carrier group is determined, the bit loading and gain can be determined for each carrier group at step 350, based on that group's worst case SNR. Thus, a "carriergroup bitloading parameter" and a "carriergroup gain parameter" can be determined for each carrier group based on that group's carriergroup SNR parameter and is used to define the carrier group. One skilled in the art will acknowledge that many methods are available for determining the bit loading and gain for a given carrier group based on the worst case SNR for the carrier group, such as the use of an SNR reference table, and that the present invention is not limited to any specific method for determining bit loading and gain.

At step 360, the carriergroup parameters are used to set up the tone-decoder in the near end modem and the tone-encoder in the far end modem. In one embodiment, the carriergroup parameters are transmitted to the far end modem to enable the far end modem to appropriately configure its tone-encoder for transmitting messages using the carrier groups and the carriergroup parameters. In another embodiment, the carriergroup parameters are used to configure the tone-decoder of the receiving modem for receiving messages using the carrier groups and the carriergroup parameters. Thus, messages transmitted using the group of carriers need only describe the carrier group using the carriergroup parameter. Because it is no longer necessary to transmit the individual parameters, such as bit loading and gain, for each carrier, the present invention provides significant cost and time savings. Thus, compression via carrier grouping in accordance with the present invention reduces the amount of memory required for storing carrier parameters and reduces the time processing time required to receive and transmit messages.

Figure 4:
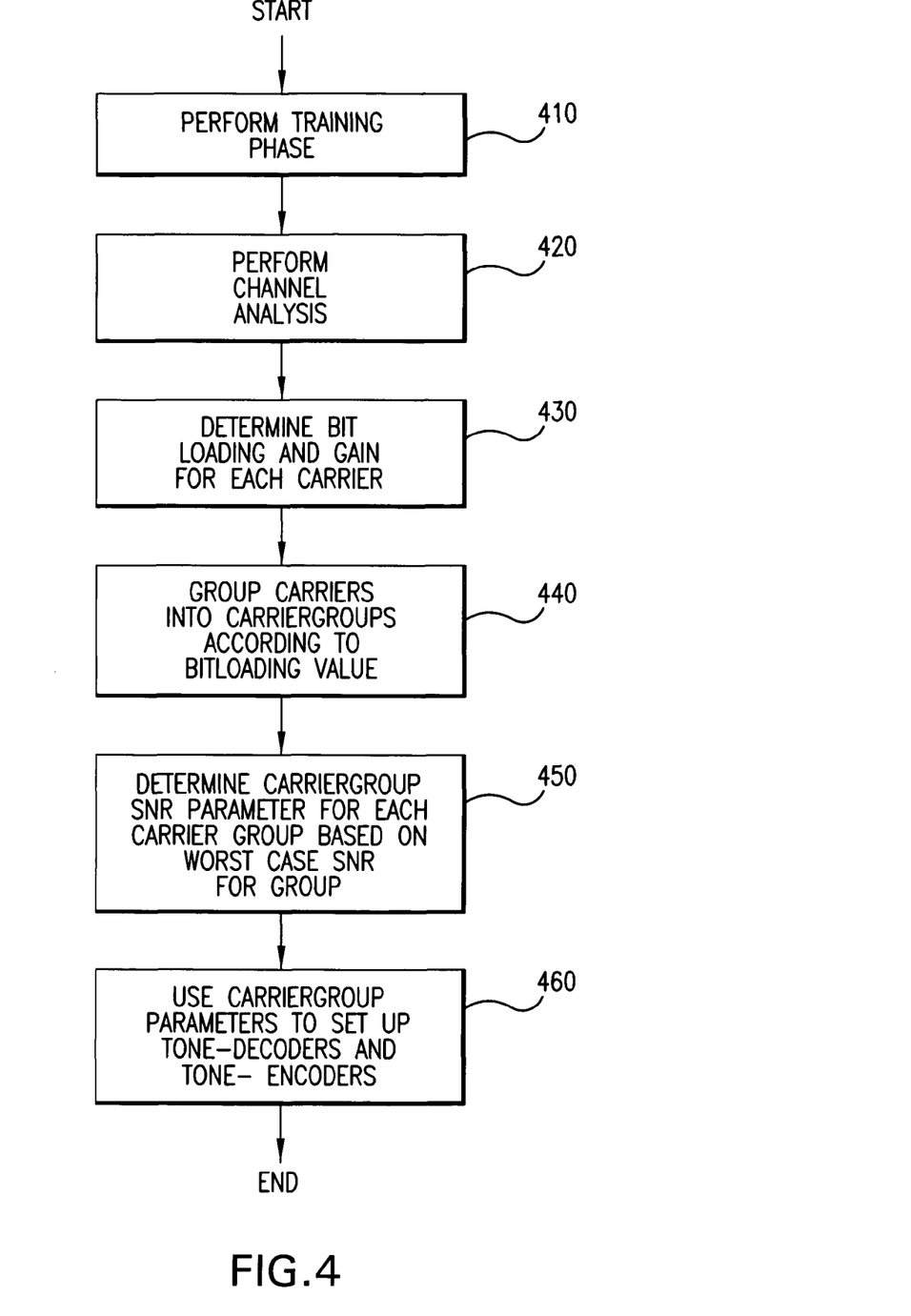
FIG. 4 is a flow chart illustrating one method for determining variable-sized carrier groups in accordance with another embodiment of the present invention.

FIG. 4 is a flow chart illustrating one method for grouping carriers in a multi-carrier system in accordance with another embodiment of the present invention. In this method, multiple carrier groups of variable size are determined for the plurality of carriers in the transmission channel. Either one or multiple carriergroup parameters are determined and used to define each carrier group. While the specific embodiment in FIG. 4 addresses a specific DMT implementation, one skilled in the art will realize that the present invention may be applied to any DMT implementation.

At step 410, a training phase is performed. During the training phase 410, the DMT modem negotiates with the far end modem about parameters to be used, determining the channel transfer function, sample and symbol alignment, and channel equalization.

After the training phase 410 is completed, a channel analysis is performed 420. In one embodiment of the present invention, the channel analysis step 420 determines an SNR for each individual carrier in the channel. This may be done by determining the SNR on a random signal transmitted by the far end modem. The channel analysis step 420 may be performed as part of the initialization process.

At step 430, a bit loading and gain value for each carrier is determined based on the SNR determined in step 420.

At step 440, the plurality of carriers in the channel is grouped into multiple carrier groups according to the bit loading value. For example, one carrier group may contain carriers having a bit loading value of 15, a different carrier group may contain carriers having a bit loading value of 14, another group may contain carriers having a bit loading value of 13, and yet another carrier group may contain carriers having a bit loading value of 12. The bit loading value for each carrier group would then be the "carriergroup bitloading parameter" for that specific carrier group. The gain associated with each carrier group would be the "carriergroup gain parameter" for the specific carrier group. Because the carrier groups are defined according to bit loading value, the carrier groups would vary in size.

At step 450, the worst case SNR for each variable-sized carrier group is used to define a "carriergroup SNR parameter" for that specific carrier group.

At step 460, the carriergroup parameters are used to set up the tone-decoder in the near end modem and the tone-encoder in the far end modem. In one embodiment, the carriergroup parameters are transmitted to the far end modem to enable the far end modem to appropriately configure its tone-encoder for transmitting messages using the carrier groups and the carriergroup parameters. In another embodiment, the carriergroup parameters are used to configure the tone-decoder of the receiving modem for receiving messages using the carrier groups and the carriergroup parameters. Thus, messages transmitted using the group of carriers need only describe the carrier group using the carriergroup parameter. Because it is no longer necessary to transmit the individual parameters, such as bit loading and gain, for each carrier, the present invention provides significant cost and time savings. Thus, compression via carrier grouping in accordance with the present invention reduces the amount of memory required for storing carrier parameters and reduces the time processing time required to receive and transmit messages.

Figure 5:
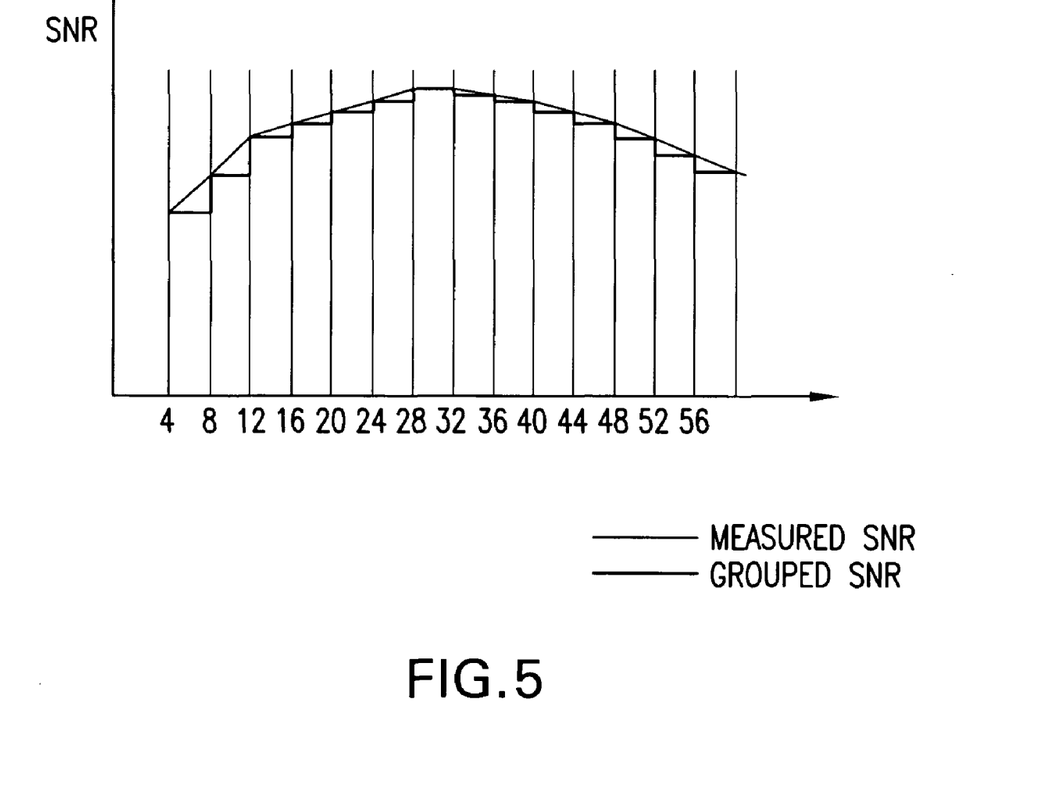
FIG. 5 is a graph illustrating fixed-sized carrier grouping in accordance with one embodiment of the present invention.

FIG. 5 is a graph illustrating "fixed-sized" carrier grouping in accordance with one embodiment of the present invention. In FIG. 5, the x-axis shows the number of carriers per carrier group and the y-axis shows the SNR of the individual carriers and the SNR of each carrier group. As illustrated in FIG. 5, carrier groups may have a fixed size such as 4 tones per carrier group. For each carrier group, the worst case SNR is used to define a carriergroup SNR parameter which defines the carrier group. For example, the carrier group containing carriers 4 through 8 has one carriergroup SNR parameter relating to the worst case SNR for those 4 carriers. Similarly, the carrier group containing carriers 8 through 12 has a different carriergroup SNR parameter relating to the worst case SNR for carriers 8 through 12. The carrier group containing carriers 12 through 16 has yet a different carriergroup SNR parameter relating to the worst case SNR for carriers 12 through 16. One skilled in the art will realize that this is just one example of how multiple carriers may be grouped in fixed-size carrier groupings and will acknowledge that other fixed-size groupings are achievable in accordance with the present invention.

Figure 6:
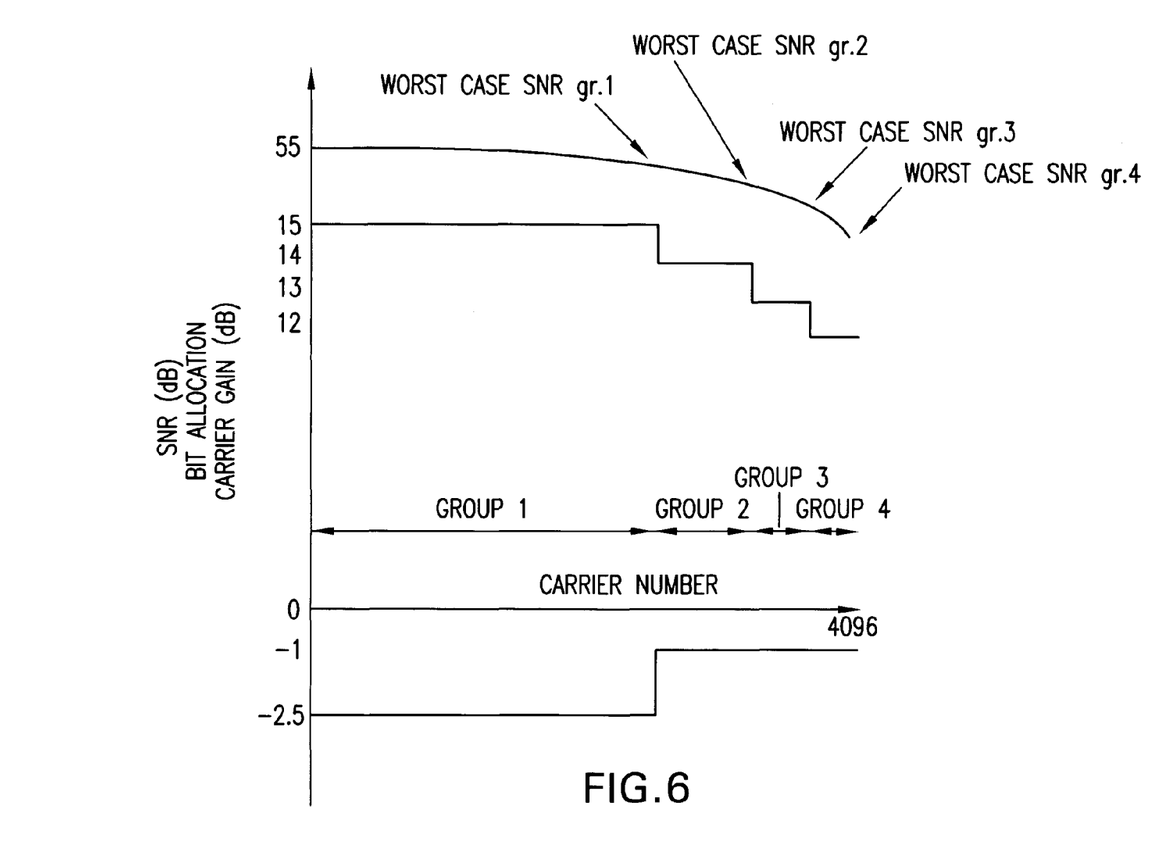
FIG. 6 is a graph illustrating variable-sized carrier grouping in accordance with one embodiment of the present invention.

FIG. 6 is a graph illustrating "variable-sized" carrier grouping in accordance with one embodiment of the present invention. In FIG. 6, 4 different carrier groups are defined: group 1, group 2, group 3, and group 4. Each carrier group has a different number of carriers in the group with group 1 having the largest number of carriers and group 4 have the smallest number of carriers in its group. FIG. 6 also illustrates the SNR for each of the individual carriers as a continuous curve. The worst case SNR for each group is determined and used to calculate the worst case bit loading and the worst case carrier gain for each group. Thus, each carrier group has a carriergroup SNR parameter based on the worst case SNR for the carriers in the group, a carriergroup bitloading parameter and a carriergroup gain parameter based on the worst case carriergroup SNR parameter for that particular group. These carriergroup parameters define parameters relating to the carrier group. In other words, rather than using the individual parameters of each carrier in each group, the carriergroup parameters may be used for the entire group of carriers. For example, for group 1, the worst case SNR carriergroup parameter is used to calculate a carriergroup bitloading parameter of 15 and a carriergroup gain parameter of −2.5 dB. In group 2, the worst case SNR carriergroup parameter is used to calculate a carriergroup bitloading of 14 and a carriergroup gain parameter of −1 dB. One skilled in the art will realize that this is just one example of how multiple carriers may be grouped in variable-sized carrier groupings and will acknowledge that other variable-sized groupings are achievable in accordance with the present invention.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A modem, comprising:
 a carriergroup receiving means configured to receive signal-to-noise ratio (SNR) parameters relating to a plurality of carriers;
 a carriergrouping means configured to group the plurality of carriers into a plurality of dynamically variable size carrier groups based on the SNR parameters, to determine a carriergroup SNR parameter for each of the plurality of dynamically variable size carrier groups, the carriergroup SNR parameter being a worst case SNR parameter from among the SNR parameters corresponding to the plurality of carriers within each of the plurality of dynamically variable size carrier groups, and to determine carriergroup bitloading and gain parameters for each of the plurality of dynamically variable size carrier groups based upon the worst case SNR parameter for each of the plurality of dynamically variable size carrier groups; and a carriergroup transmitting means configured to transmit at least one message including the carriergroup bitloading and gain parameters for each of the plurality of dynamically variable size carrier groups.

2. The modem of claim 1, further comprising:
means for using the at least one message to set up a tone encoder in a far-end modem.

3. A method for grouping a plurality of carriers in a DMT communication system, comprising:
grouping the plurality of carriers used for communication in the DMT communication system into a plurality of dynamically variable size carrier groups;
determining a plurality of carriergroup parameters for each of the plurality of dynamically variable sized carrier groups, the plurality of carriergroup parameters including a carriergroup signal-to-noise ratio (SNR) parameter being a worst case SNR parameter relating to the plurality of carriers within the dynamically variable size carrier group and carriergroup bitloading and gain parameters based upon the carriergroup SNR parameter for the dynamically variable size carrier group;
using the plurality of carriergroup parameters to dynamically set up a tone encoder; and
sending at least one message using the tone encoder, the at least one message including the plurality of carriergroup parameters.

4. The method of claim 3, further comprising:
setting up a tone encoder in a far end modem using the at least one message.

5. The method of claim 3, further comprising:
setting up a tone encoder using the carriergroup bitloading and gain parameters.

6. A method for grouping a plurality of carriers in a DMT communication system, the DMT communication system including a near end and a far end modem, comprising:

determining at least one dynamically variable sized carrier group from the plurality of carriers used for communication in the DMT communication system;
determining a worst case carriergroup signal-to-noise ratio (SNR) for the plurality of carriers within the at least one dynamically variable sized carrier group;
determining a carriergroup bitloading and a carriergroup gain for the plurality of carriers within the at least one dynamically variable sized carrier group based on the worst case carriergroup SNR;
using the carriergroup bitloading and the carriergroup gain to dynamically set up a tone encoder in the far end modem; and
using the carriergroup bitloading and the carriergroup gain to transmit messages from the far end modem to the near end modem using the tone encoder.

7. The method of claim 6, wherein the communication system is a VDSL system.

8. A modem for grouping a plurality of carriers in a DMT communication system coupled to a far-end modem via a transmission channel, comprising:
a carriergrouping means configured to group the plurality of carriers into a plurality of dynamically variable size carrier groups, to determine a carriergroup signal-to-noise ratio (SNR) parameter for each of the plurality of dynamically variable size carrier groups, the carriergroup SNR parameter being a worst case SNR parameter relating to the plurality of carriers within each of the plurality of dynamically variable size carrier groups, and to determine a carriergroup bitloading and gain parameters for each of the plurality of dynamically variable size carrier groups based upon the carriergroup SNR parameter for each of the plurality of dynamically variable size carrier groups; and a carriergroup transmitting means configured to transmit messages including each of the carriergroup bitloading and gain parameters to the far-end modem via the transmission channel to enable the far-end modem to send and receive messages using the plurality of dynamically variable size carrier groups.

9. The modem of claim 8, wherein the messages are used to set up a tone encoder in the far-end modem coupled to the transmission channel.

* * * * *